US007755747B2

(12) United States Patent
Graβl et al.

(10) Patent No.: US 7,755,747 B2
(45) Date of Patent: Jul. 13, 2010

(54) DEVICE AND METHOD FOR CHECKING THE AUTHENTICITY OF AN ANTI-FORGERY MARKING

(75) Inventors: Björn Graβl, Nürnberg (DE); Radoslav Maksimovic, Erlangen (DE); Georg Bauer, Nürnberg (DE); Ralph Domnick, Buckenhof (DE); Harald Walter, Birmensdorf (CH)

(73) Assignee: Secutech International Pte. Ltd., Singapore (SG)

( * ) Notice: Subject to any disclaimer, the term of this patent is extended or adjusted under 35 U.S.C. 154(b) by 1390 days.

(21) Appl. No.: 10/528,446

(22) PCT Filed: Oct. 2, 2003

(86) PCT No.: PCT/EP03/10964

§ 371 (c)(1),
(2), (4) Date: Apr. 25, 2005

(87) PCT Pub. No.: WO2004/034338

PCT Pub. Date: Apr. 22, 2004

(65) Prior Publication Data

US 2005/0257270 A1 Nov. 17, 2005

(30) Foreign Application Priority Data

Oct. 5, 2002 (DE) .................... 102 46 563

(51) Int. Cl.
*G06K 9/74* (2006.01)
(52) U.S. Cl. ..................... 356/71
(58) Field of Classification Search ............. 356/71; 235/435, 454
See application file for complete search history.

(56) References Cited

U.S. PATENT DOCUMENTS

| 4,710,627 A | * | 12/1987 | Baltes et al. | 250/339.11 |
|---|---|---|---|---|
| 4,881,268 A | * | 11/1989 | Uchida et al. | 382/135 |
| 4,930,866 A | * | 6/1990 | Berning et al. | 359/589 |
| 4,968,143 A | | 11/1990 | Weston | |
| 5,042,893 A | | 8/1991 | Ong | |
| 5,304,813 A | * | 4/1994 | De Man | 250/556 |
| 5,369,481 A | | 11/1994 | Berg et al. | |
| 5,394,234 A | * | 2/1995 | Bianco et al. | 356/71 |
| 5,498,879 A | * | 3/1996 | De Man | 250/556 |
| 5,517,338 A | | 5/1996 | Vaughn et al. | |

(Continued)

FOREIGN PATENT DOCUMENTS

DE 44 34 168 A1 3/1996

(Continued)

*Primary Examiner*—Roy Punnoose
(74) *Attorney, Agent, or Firm*—Manabu Kanesaka

(57) ABSTRACT

The invention relates to a device for checking the authenticity of an anti-forgery marking with colors which change depending on the angle of observation, comprising a) several first light sources, emitting in a given spectral range, whereby the light sources are different from each other with regard to the wavelength of the emission maximum thereof and the first light sources (1) are housed in a housing (5) such as to irradiate the surface (O), with the housing (5) placed thereon, at a given first angle (α1), b) a first means (2) for measuring the intensity of the light reflected from the surface (O) arranged at a second angle (α2) and c) a means (7) for the automatic comparison of measured intensities with the reference intensities stored for at least one given color for each light source (1).

27 Claims, 5 Drawing Sheets

U.S. PATENT DOCUMENTS

| | | | |
|---|---|---|---|
| 5,596,402 A | 1/1997 | Markantes et al. | |
| 5,611,998 A | 3/1997 | Aussenegg et al. | |
| 6,285,452 B1 | 9/2001 | Baker | |
| 6,473,165 B1 * | 10/2002 | Coombs et al. | 356/71 |
| 6,570,648 B1 * | 5/2003 | Muller-Rees et al. | 356/71 |
| 6,628,439 B2 * | 9/2003 | Shiozawa et al. | 359/2 |
| 7,006,204 B2 * | 2/2006 | Coombs et al. | 356/71 |
| 2002/0191175 A1 * | 12/2002 | Coombs et al. | 356/71 |

FOREIGN PATENT DOCUMENTS

| | | |
|---|---|---|
| DE | 196 17 009 C2 | 11/1997 |
| DE | 199 62 779 A1 | 6/2001 |
| EP | 0 165 535 A2 | 12/1985 |
| EP | 0 341 002 A2 | 11/1989 |
| EP | 0 505 878 A1 | 9/1992 |
| EP | 0 949 499 A1 | 10/1999 |
| JP | 59 060 324 A | 4/1984 |
| WO | 96/39307 | 12/1996 |
| WO | 97/01156 | 1/1997 |
| WO | 98/48275 | 10/1998 |
| WO | 99/44702 | 9/1999 |
| WO | 01/53113 | 7/2001 |
| WO | 02/18155 | 3/2002 |
| WO | 02/31780 | 4/2002 |

* cited by examiner

DEVICE AND METHOD FOR CHECKING THE AUTHENTICITY OF AN ANTI-FORGERY MARKING

RELATED APPLICATIONS

The present application is based on International Application No. PCT/EP03/10964, filed Oct. 2, 2003, and claims priority from, German Application Number 102 46 563.0, filed Oct. 5, 2002, the disclosure of which is hereby incorporated by reference herein in its entirety.

FIELD OF THE INVENTION

The invention relates to a device and a method for checking the authenticity of a forgery-proof marking with colors which change depending on the angle of observation.

BACKGROUND OF THE INVENTION

Such markings are used to identify bank notes and other financial products such as securities, checks, admission tickets and similar, as well as for product and brand protection. Such markings are also being used increasingly in security technology. They are used there for example to mark access IDs.

In accordance with the state of technology it is generally known that colors can be determined on surfaces with the aid of spectrometers. From U.S. Pat. No. 5,369,481 as well as U.S. Pat. No. 4,968,143 devices for the measurement of colors are known which use the measuring principle of the so-called Ulbricht's sphere. With this the surface is illuminated with white light at various angles. The diffused light is acquired at a fixed angle and spectrally analyzed. The known devices are expensive. They are not suitable for measurement of colors which change depending on the angle of observation.

From U.S. Pat. No. 5,042,893 a device is known for spectral analysis. With this the reflected light from a sample is coupled into a light-conducting fiber and conducted to a spectrometer. There it is split spectrally and the intensity of the spectrally split light is measured with a photo diode bank. The device is particularly expensive due to the required light-conducting fiber optics. It is not immediately suitable for measuring of colors which change depending on the angle of observation.

U.S. Pat. No. 6,285,452 describes a device for measuring colors during which the surface of a sample is irradiated without using light-conducting fiber optics. The light thrown back by the sample is analyzed spectrally. This device also requires expensive spectral-splitting components. It is also not suitable for the measurement of colors which change depending on the angle of observation.

From WO 02/18155 A2 a forgery-proof marking is known. The marking has colors which change depending on the angle of observation. These so-called tilt-angle colors are created by a cluster layer positioned at a specified distance from a metal layer. Tilt-angle colors created like this have a particularly distinct and characteristic spectrum.

Moreover from DE 44 34 168 A1 or DE 199 62 779 A1 for example, devices are known which determine the quality of color surfaces. Such devices are used to determine the color and gloss of the surface. However such devices are not suitable for the determination of tilt-angle colors.

SUMMARY OF THE INVENTION

The object of the invention is to eliminate the disadvantages in accordance with the state of technology. In particular a device and a method are to be specified with which the authenticity of a forgery-proof marking can be checked easily and inexpensively.

According to the invention a device is provided to check the authenticity of a forgery-proof marking with colors which change depending on the angle of observation, with a) several first light sources which emit light in a specified spectral range, wherein the light sources differ in the wavelength of their emission maximum, and wherein the first light sources in a housing are positioned so that they irradiate the surface at a specified first angle when the housing is placed on top of the surface, b) a first means, located at a second angle, of measuring the intensity of the light reflected from the surface, and c) a means of automatic comparison of the measured intensities with the reference intensities stored for the particular light sources for at least one specified color.

The suggested device has a simple design. In particular there are no expensive spectral-splitting components. With the suggested device the light reflected by the surface is not spectrally split up. Instead, light in several different wavelengths is beamed to the surface and their reflected intensities are measured. These are compared with reference intentsities which were previously measured for at least one specified color. Such a device can be implemented with relatively inexpensive, available components.

According to an embodiment several second light sources emitting in a specified spectral range are provided, wherein the second light sources differ from one another in the wavelength of their emission maximum, and wherein the second light sources in the housing are positioned so that they irradiate the surface at a specified third angle when the housing is placed on top of the surface. The provision of second light sources which irradiate the surface at a specified third angle permits the colors to be determined in dependence on the angle of observation. This makes it particularly easy to identify tilt-angle effects as they are particularly used for forgery-proof marking of bank notes or similar.

It is useful that a second means located at a fourth angle is provided for the measurement of the intensities of the light reflected by the surface. The provision of such a second means of measuring the intensities ensures particularly reliable recognition and determination of the colors. For example it is possible to irradiate the surface via the first light source to determine colors and to acquire the reflected light both with the first and the second means of measuring the intensities of the light reflected by the surface at different angels. This permits a particularly reliable color determination. At the same time the provision of the second means of measuring the intensities of the reflected light also permits the determination of the colors which change depending on the angle of observation.

It has been shown to be advantageous that the specified spectral range at half maximum intensity has a width of less than 100 nm, preferably less than 50 nm. The width at half maximum intensity is also called the half-value width or full-width-at-half-maximum (FWHM). The use of light-emitting diodes, lasers or the free ends of the thereby connected light-conducting fibers has been shown to be useful. Light-emitting diodes can also be used which can emit light at different wavelengths. It is advantageous that the means of measuring the intensities has at least one photo diode.

According to a further embodiment the first angle is equal to the second angle so that the light irradiated on the surface is measured specularly reflected at the second angle. With this the first light sources and the first means of measuring the intensities are thus arranged at the same angle with reference to the normal on the measuring point. With the suggested arrangement the reflected intensities are maximal. This increases the reliability and the speed of the measurement.

According to a further embodiment feature, the third angle is equal to the fourth angle so that the light beamed onto the surface at the third angle is measured specularly reflected at the fourth angle. This permits a particularly reliable determination of the colors which change depending on the angle of observation.

According to a further embodiment, the first and the third angle differ from each other and are located in a range from 5° to 60°, preferably from 15° to 45°. Intensities are reflected under the aforementioned angles which are well suited for measuring.

According to a further advantageous embodiment, a unit is provided for the sequential illumination of the surface with the light sources and for measurement of the particular intensities of the reflected light in a defined sequence.

Moreover it is advantageous that the emission maximum of the light sources is in the near UV, in visible or in the IR spectral range. Particularly suitable are light sources in the wavelength range from 350 nm to 1000 nm.

According to a further embodiment, duration of the illumination and the measurement is specified in dependence on the luminance characteristic of each of the light sources and/or the measuring characteristic of the means of measuring the intensities. A suitable unit for the control of the duration of illumination and measurement is provided for this. The luminosity of the light sources depends to a great extent on the emitted wavelength. To obtain comparable measuring signals, it is useful to adjust the luminance duration of the individual light sources in dependence on their emitted wavelength. In the same way the duration of measurement is adjusted to the measuring characteristic of the means of measuring the intensities.

According to a further embodiment, mechanical, electronic or technical software units are provided for the offset of background light. Background light, surrounding light for example, affects the measuring signal. Using the mechanical units, surrounding light is screened out as much as possible. It is also possible to consider remaining light which arrives at the means of measuring the intensities when the light sources are off. A so-called dark measurement can be performed either before or after the actual color measurement. Moreover undesired interference signals such as frequencies of 50 Hz or 100 Hz can be separated from the actual measuring signals with electronic filters or software-supported filters.

According to a further embodiment, at least 3 and not more than 12 first and/or second light sources are provided. The number of light sources which are used affects the accuracy of the color determination. For reasons of space and arrangement, it has been shown to be particularly advantageous to use between 4 and 7 light sources per measuring angle.

According to a further embodiment, the means is equipped with a micro-controller for automatic comparison or to calculate the coordinates of the color range. Reference intensities or coordinates of the color area can be stored on the micro-controller and compared with the measured values. It is useful that an indication device, preferably a display or one or more additional light-emitting diodes, is provided to indicate the result determined by the comparison. The indication device can also be integrated in an external unit such as, for example, PDA or laptop which exchanges data with the device via a cable or via wireless connections. Such an indication device makes it possible, for instance, to also allocate an origin parameter to an identified tilt-angle color and output this with the indication device. Markings can thus be identified with encrypted information about distribution routes, origin or for logistic purposes in a way which cannot be recognized during transportation.

It is useful that a unit for modulation of the light sources is provided to separate the interference signals from the measuring signals.

It has been shown to be particularly advantageous that the forgery-proof marking has a first layer which reflects electromagnetic waves and is connected to an object, on which layer an inert second layer with a specified thickness is provided which can be penetrated by electro-magnetic waves, and wherein a third layer created from metallic clusters is applied to the second layer. The "object" is the object to be marked, for example, a bank note, a label or similar. The suggested marking is particularly resistant to forgery. The colors have a characteristic spectrum. It is particularly notable that, when such a marking is reproduced, the same colors can always be observed for the same tilt angles. This makes it possible to automatically check the authenticity of the marking.

The device as provided by the invention is particularly suited for checking the authenticity of the suggested forgery-proof marking. To this extent, the device provided by the invention and the forgery-proof marking together form a coordinated system or a kit to ensure the authenticity of objects.

According to a further embodiment, at least one of the layers can have a structure. The structure can be a structure in the area like a pattern or a drawing. However it can also be a relief-type structure. In this case, the marking appears in different colors.

According to a further embodiment feature, an inert fourth layer is provided which covers the third layer and which can be penetrated by electromagnetic waves. The fourth layer is used essentially to protect the covered layers.

The metallic clusters can be made of silver, gold, platinum, aluminum, copper, tin, iron, cobalt, chromium, nickel, palladium, titanium or indium, for example. The second and/or fourth layer can be made of the following materials: metal oxide, metal nitride, metal carbide, particularly of silicon oxide, silicon nitrite, tin oxide, tin nitrite, aluminum oxide, aluminum nitrite or polymers, in particular polycarbonate (PC), polyethylene (PE), polypropylene (PP), polyurethane (PUR), polyimide (PI), polystyrene (PS), polyethylene terephthalate (PET) or polymethacrylate (PMA). These materials are essentially chemically inert. They are not sensitive to moisture. The function of the second layer essentially consists of permanently establishing a specified distance to the third layer and/or a specified structure.

According to a further embodiment, it is provided that a unique identifiable coloring is recognizable at a distance of less than 2 μm between the first and the third layer. The coloring depends on the angle of observation and is characteristic.

According to a further embodiment feature, it is provided that the layers will be made at least partially using thin-film technology. In particular, vacuum coating technologies such as PVD or CVD as well as printing technologies such as gravure printing can be used.

Also according to the invention, a method is provided for checking the authenticity of a forgery-proof marking with colors which change depending on the angle of observation consisting of the following steps:

aa) Irradiation of the surface with several first light sources which are emitting light in a specified spectral range at a first angle, wherein the light sources differ from each other in the wavelength of their emission maximum, bb) Measurement of the intensities of the light reflecting from the surface at a second angle, and cc) Comparison of the measured intensities with the stored reference intensities for the particular light sources for at least one specified color, or calculation of the coordinates of the color range.

The suggested method is simple and can be performed without great technical effort. In particular, no expensive spectral-splitting components are required. Notwithstanding, the suggested method permits the reliable determination of the authenticity of forgery-proof markings with colors which change depending on the angle of observation.

The advantageous embodiments of the method correspond to those of the device and can be applied accordingly to the method in the same way.

BRIEF DESCRIPTION OF THE DRAWING

Examples will now be used to describe the invention in more detail based on the drawing. The figures are listed below.

DETAILED DESCRIPTION OF THE INVENTION

Figure 1:
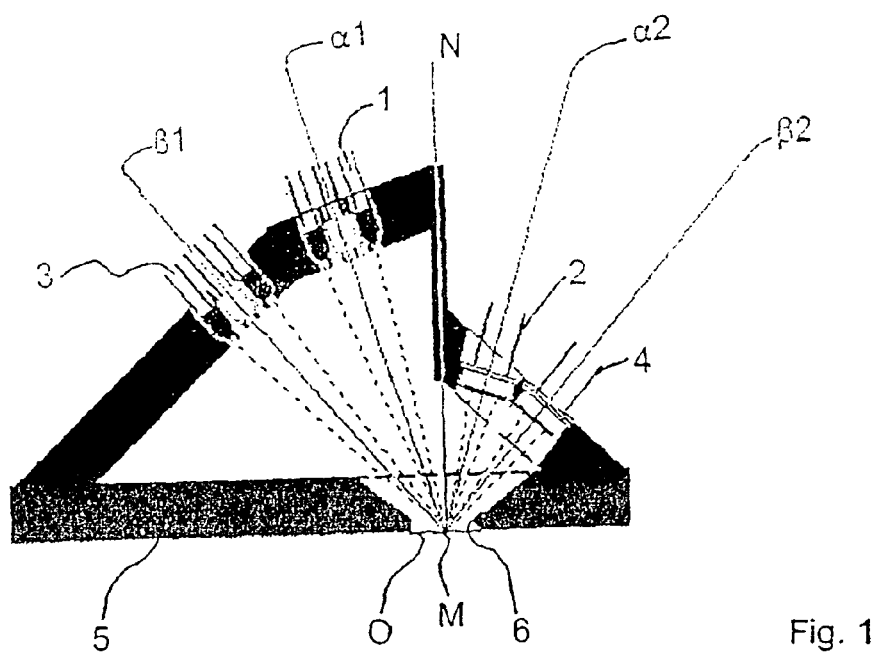
FIG. 1 A schematic cross section view of a measuring head of the device.

FIG. 1 shows a measuring head of a device for determination of colors applied to a surface which colors change depending on the angle of observation. 1 indicates a group of first light sources with which the measuring point M located on a surface O of the sample can be illuminated at a first angle $\alpha 1$. A first photo diode 2 is located at a second angle $\alpha 2$. Moreover the measuring head contains a group of second light sources 3 at a third angle $\beta 1$. A second photo diode 4 is provided at a fourth angle $\beta 2$. The first angle $\alpha 1$ and the second angle $\alpha 2$ have the same size on the measuring point M with reference to a normal N. In addition the lines related to the two angles as well as the normal N are located in one plane.

In the same way the third angle $\beta 1$ and the fourth angle $\beta 2$ are equal in size with reference to the normal N. Also the lines of these two angles are located in one plane with the normal N. Light sources 1, 3 and photo diodes 2, 4 are mounted in a common, light-impermeable housing 5 which has a measuring opening 6 in the floor.

Both with the first light sources 1 and the second light sources 3, the light-emitting diodes may have an emission spectrum of a half value width of less than 50 nm. The emission maximums of the light-emitting diodes each differ from one another. Notwithstanding, it is useful that the first group of light sources 1 and the second group of light sources 2 each have the same number of light-emitting diodes with the same luminance characteristic.

Figure 2:
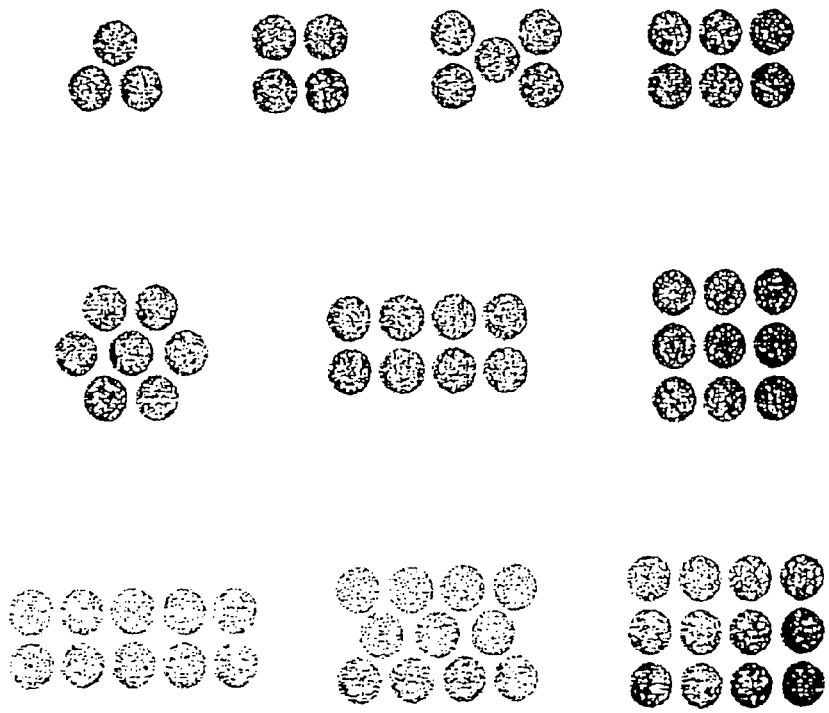
FIG. 2 Arrangements of light sources.

FIG. 2 shows different arrangements of the first light sources 1 and the second light sources 2. The first light sources 1 can consist of at least 3 and not more than 12 different incandescent elements. It is particularly preferable that the first light sources 1 and the second light sources 2 consist of 7 different incandescent elements. In addition to light-emitting diodes the incandescent elements can also be lasers or the one end of light-conducting fibers whose other ends are connected to a light source such as for example a light-emitting diode or a laser.

Figure 3:
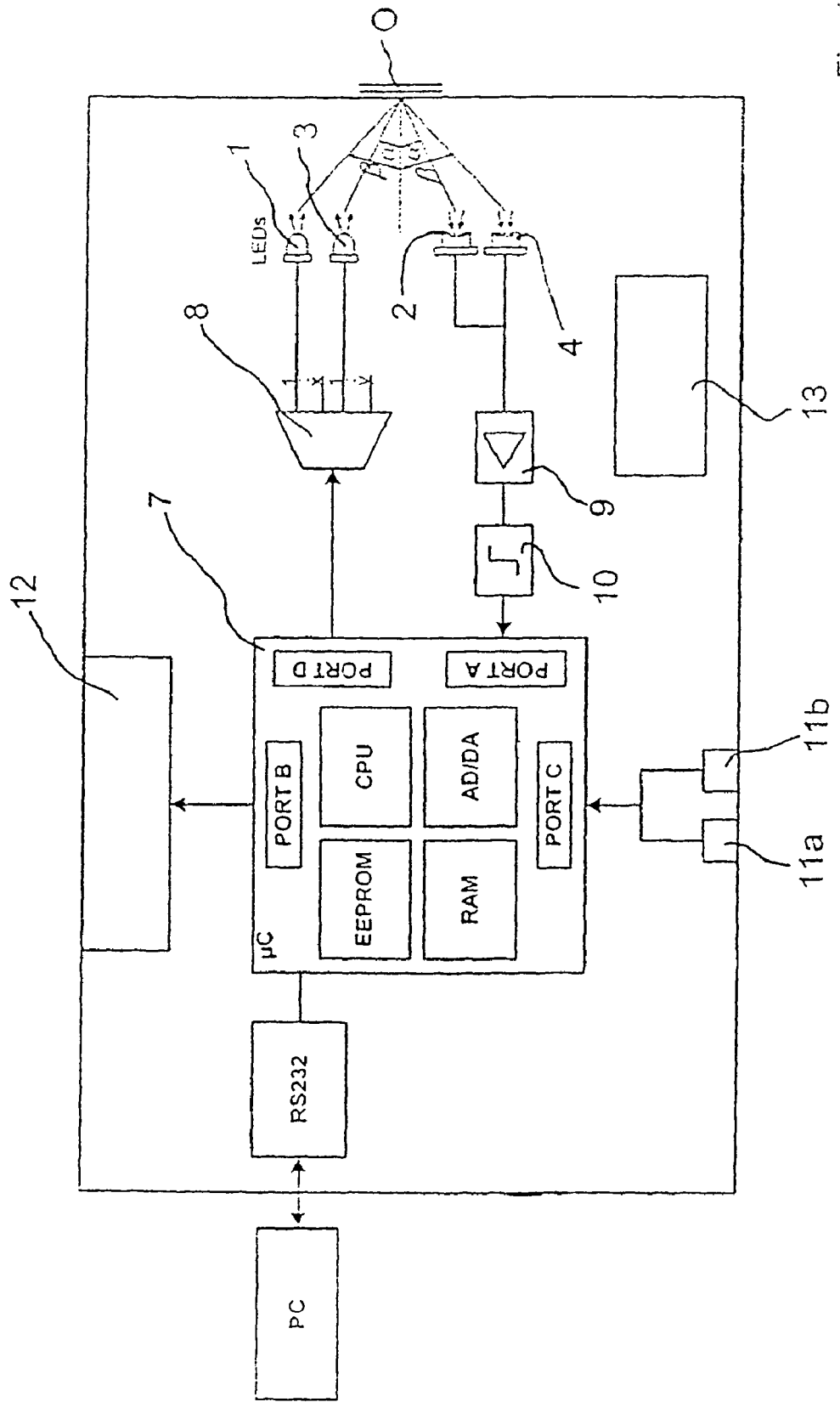
FIG. 3 A block circuit diagram of the device.

FIG. 3 shows a schematic block circuit diagram of the layout of a device provided by the invention. A micro-controller 7 is equipped with several inputs/outputs port A, port B, port C, port D, a micro-processor CPU, an analog-digital converter AD/DA, a random access memory RAM, a hard-drive, electrically erasable, programmable, read-only memory EPROM as well as an RS 232 interface and an ICP interface for the connection to external data processing units such as for example a PC. The input/output port D is connected via a de-multiplexer 8 with the first light sources 1 and the second light sources 3. The housing 5 has been omitted here for clarity's sake. The first photo diode 2 and the second photo diode 4 are connected via an amplifier 9 and a filter 10 with the input/output port A of the micro-controller 7. To control the device, manual buttons 11a, 11b are connected with the input/output port C. The other input/output port B is used to connect an indication device 12 or a light-emitting diode. 13 shows a power supply unit which can consist of batteries or rechargeable storage batteries and voltage regulators for example.

The function of the device is the following:

The flash program memory of the micro-controller contains a specified measuring program. The measuring program can be started by pressing the first button 11a after the housing 5 has been placed on the surface O to be measured. It is useful to first measure the background light via the first photo diode 2 and the second photo diode 4. The measured value is stored by the measuring program in the random access memory RAM. The light sources 1 are then turned on in succession for a specified period of time. During the turn-on phase, a measurement of the reflected intensity is performed for each of the light sources 1 using the first photo diode 2 and the second photo diode 4. The measured values are offset using the previously measured values of the background light and also stored in the random access memory RAM. After conclusion of the measurement, the measured values are compared with the reference intensities stored in the EPROM. When the measured values are within a specified range of reference intensities, the measuring program determines that the measured color matches the color corresponding to the reference intensities. The result is output on the indication device 12. In this way, not only colors but also colors which change depending on the angle of observation can be determine reliably and simply. Such reference intensities can be determined for example with a reference measurement of a specified color and then stored. Naturally it is possible to determine reference intensities for a plurality of specified colors and then store them. For example, reference intensities of colors can be stored with tilt-angle effects for different channels of distribution. The suggested device can then not only be used to detect whether the applicable product is authentic but also whether it was delivered via the correct distribution channel.

The second key 11b is pressed to perform a further measurement. In this case the measurement can begin immediately. The measured value of the background light which was already determined can be used to offset the measuring results.

Instead of a comparison of the measured intensities and the reference intensities, it is naturally also possible to calculate the coordinates in the color range on the basis of the measured intensities. In this case, the program must be changed accordingly.

To offset the measured values or to separate the measured values from interference signals, it has been shown to be useful to provide a unit to modulate the light sources 1, 3. In this case, the light sources 1, 3 are operated with a specified frequency during the turn-on phase. The intensities measured by photo diodes 2, 4 are only included to the extent that they can be measured within the observed frequency window. Interference frequencies caused by artificial light, among others, for example 50 Hz or 100 Hz, can be eliminated in this way. For example all non-modulated signals can be separated from the modulated signals via lock-in technology.

It is useful to load suitable measuring programs or the programming of the micro-controller via the ICP interface.

It is useful to install the device in a single housing together with the measuring head so that it is a portable, hand-held device. However it is also possible that the measuring head is connected with a cable to the device. When the device provided by the invention is only to be used for simple determination of colors on surfaces, it is sufficient to provide first light sources 1 and the first photo diode 2 and/or the second photo diode 4. To measure colors which change depending on the angle of observation, it is necessary to provide first light sources 1 and second light sources 3 as well as the first photo diode 2 and/or the second photo diode 4.

To minimize the total measuring duration with sequential measuring methods it has been shown to be advantageous to terminate the measuring procedure and to begin again at the beginning when between 1 and 5 of the measured intensity values do not correspond to the stored reference intensities. It is particularly advantageous when this termination criterion is 3 intensity values. This allows the device to run in a dynamic mode which makes handling simple. As soon as a data record of measured intensity values which corresponds to the reference intensities has been found, the measuring procedure is terminated and a positive measuring result is output. To restrict total measuring time, the measuring duration is limited to 5 seconds for example. If no match of the measured intensity values with the reference intensities has been achieved by then, a negative measuring result is signaled.

Figure 4:
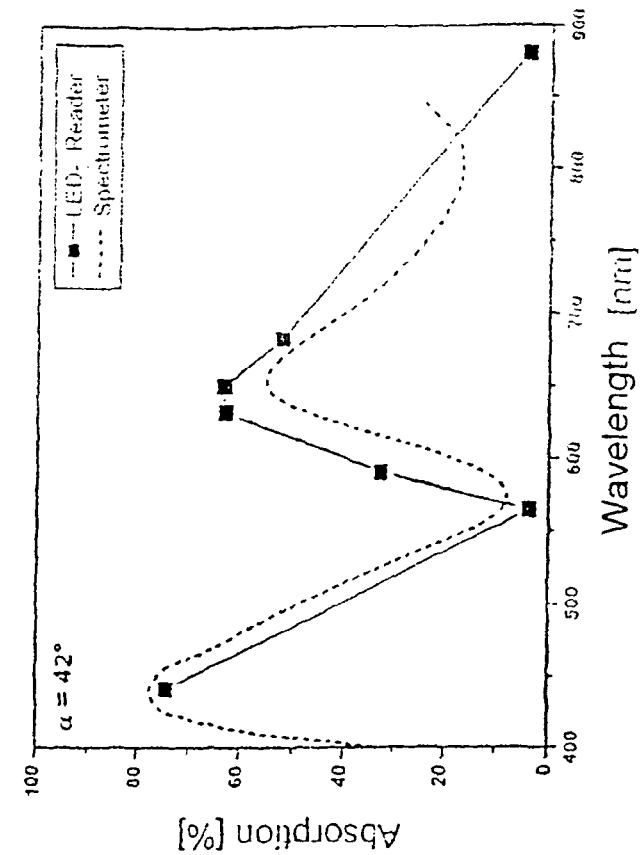
FIG. 4 Measuring results of the absorption measurements at different angles of illumination, FIG. 5 A schematic cross section view of a first continuously visible marking, FIG. 6 A schematic cross section view of a second continuously visible marking, FIG. 7 Absorption spectrums of a marking as per FIG. 5 at different angles of observation and FIG. 8 A quantitative evaluation of the spectrums as per FIG. 7 at different wavelengths.
Figure 4:
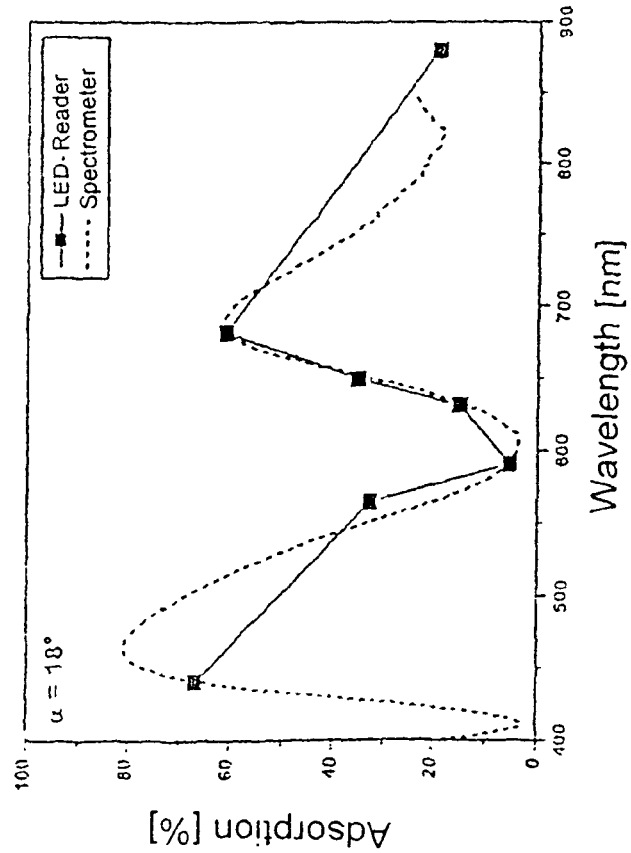

FIG. 4 shows a comparison of the measuring values of a reader device which works according to the invention and the measured values of a commercially available spectrometer (LIGA micro-spectrometer STEAG microParts). The reader device uses an optical head as shown in FIG. 1 and illuminates the surface of each measured tilt color sequentially with light-emitting diodes of the wavelengths 441, 565, 591, 632, 650, 682 and 880 nm. A color changing in dependence on the angle of observation was measured at the angles 18° and 42°. From the intensity measuring values I obtained from this and the maximum reflected intensities $I_{max}$ obtained from an analog measurement on a polished aluminum mirror, the absorption A can be calculated as a percentage.

$$A = I/I_{max} * 100$$

As can be seen in FIG. 4, the absorption values of the described reader device very closely follow the curve progression of the absorption measured by the spectrometer for both measuring angles.

Figure 5:
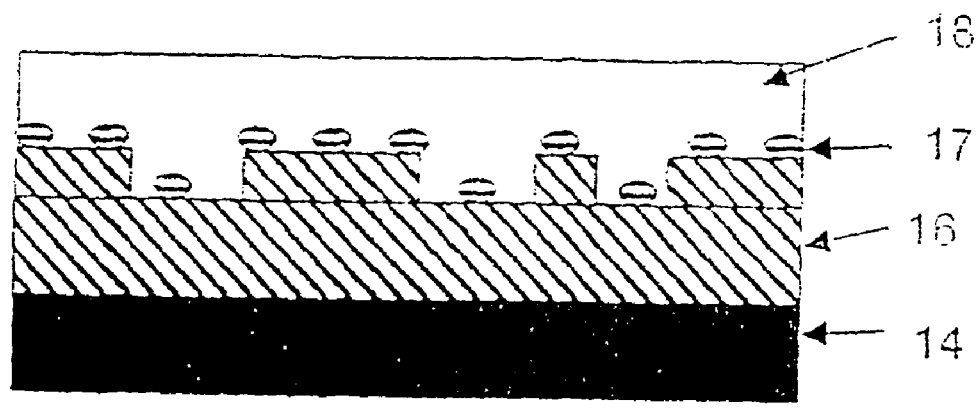
Figure 6:
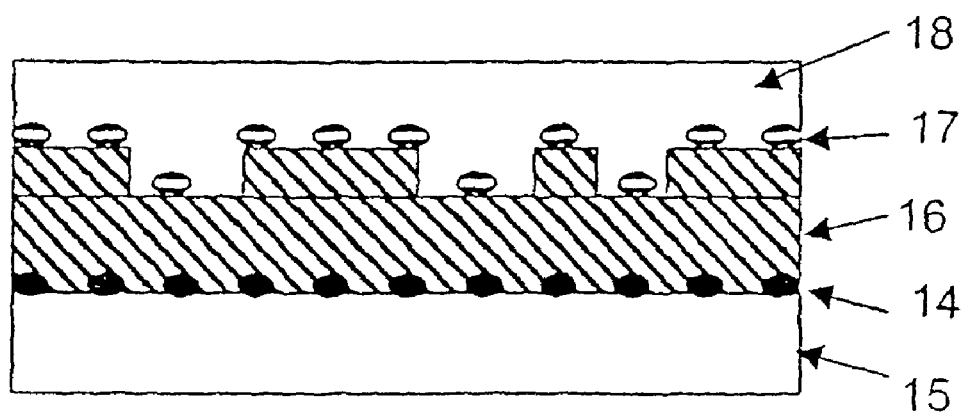

With the markings shown in FIGS. 5 and 6, a first layer reflecting electro-magnetic waves is designated as 14. This can be a metallic foil, for example an aluminum foil. However the first layer 14 can also be a layer made of clusters which is applied to a carrier 15. The carrier 15 can be the object to be marked. It is useful when the clusters are made of gold. Similarly, the first layer 14 shown in FIG. 5 can also be the object if its surface is made of a material which reflects electromagnetic waves.

A chemically inert second layer 16 is applied to the first layer 14. The second layer 16 has a structure. Here the structure is in the form of a relief which, for example, is designed like a barcode. It is advantageous that the thickness of the second layer is between 20 and 1000 nm. It applied via thin-film technology. Vacuum coating methods, for example, are suitable for this.

With the marking shown in FIGS. 5 and 6, a third layer 17 which is made of metallic clusters is applied to the second layer 16. The third layer 17 in turn is covered by a fourth layer 18. The fourth layer 18 protects the layers below from damage. As with the second layer 16, the fourth layer 18 can be made of a chemically inert and optically transparent material, metal oxide, metal nitrite, metal carbide, or polymer, for example.

The function of the marking consists of the following:

When light from a light source of the device provided by the invention shines on a marking shown in FIGS. 5 and 6, this light is reflected on the first layer 14. The interaction of the reflected light with the third layer 17 created from the metallic clusters causes a portion of the irradiated light to be absorbed. The reflected light has a characteristic spectrum. The marking appears in color. The color depending on the angle of irradiation or observation or the characteristic spectrum is the forgery-proof evidence of the authenticity of the marking.

With regard to the parameters which must be adhered to when interactions are generated, reference is made to U.S. Pat. No. 5,611,998, WO 98/48275 as well as WO 99/47702 whose disclosed contents are herewith included.

Figure 7:
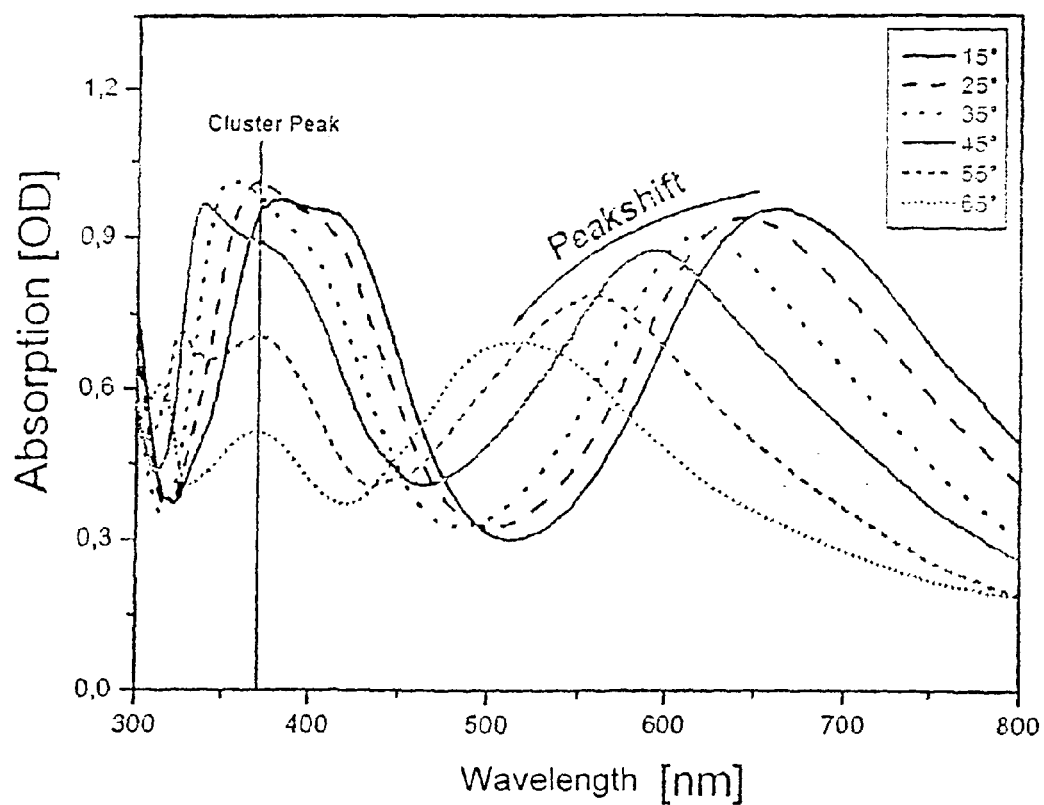

The spectrums of a marking as per FIG. 5 which are shown in FIG. 7 were measured via a UV/VIS spectrometer lambda 25 of "Perkin Elmer" using a reflection unit. From FIG. 7 it can be seen that the longer wave peak shifts to shorter wave lengths as the angle of observation increases. Moreover a fixed peak can be observed which is due to the silver clusters.

Figure 8:
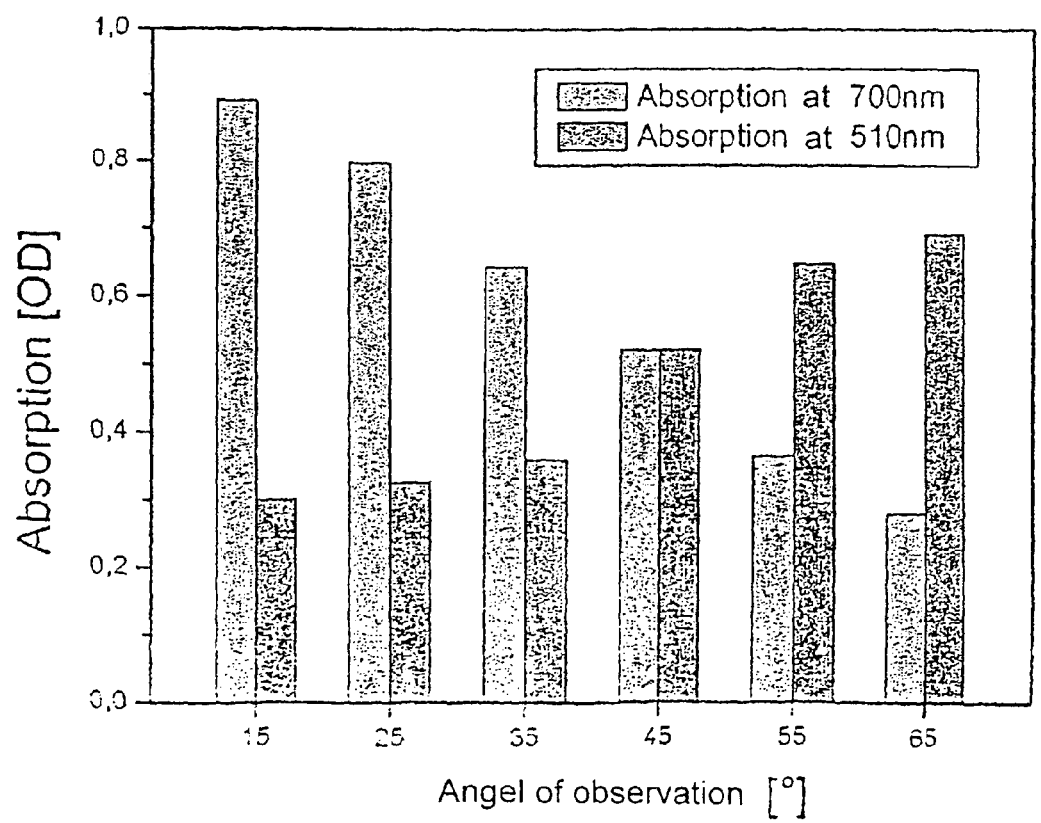

FIG. 8 shows a quantitative evaluation of the spectrums as per FIG. 7 with two different wavelengths each. With the observed wavelengths, a change in absorption depending on the angle of observation is observed. The absorption pattern is characteristic of the authenticity of the marking.

REFERENCE DESIGNATION LIST

1 First light sources
2 First photo diode
3 Second light sources
4 Second photo diode
5 Housing
6 Measuring opening
7 Micro-controller
8 De-multiplexer
9 Amplifier
10 Filter
11a, b First, second button 12 Indication device
13 Power supply
14 First layer
15 Carrier
16 Second layer
17 Third layer
18 Fourth layer
O Surface
M Measuring point
α1, α2 First, second angle
β1, β2 Third, fourth angle
N Standard
Port A, B, C, D Input/output
AD/DA Analog-digital converter
RAM Random access memory
EEPROM Electrically-erasable, programmable, read-only memory, non-volatile memory
CPU Central processing unit
RS 232 Interface
PC Personal computer, data processing unit

The invention claimed is:

1. Device for checking an authenticity of a forgery-proof marking having a surface with colors which change depending on an angle of observation, comprising:
   a) several first light sources which emit light in a specified spectral range, wherein the first light sources differ from one another in wavelength of their emission maximum, and wherein the first light sources are installed in a housing so that they irradiate a surface of the marking at a specified first angle when the housing is placed on the surface,
   b) several second light sources which emit light in a specified spectral range, wherein the second light sources differ from each other in wavelength of their emission maximum, and wherein the second light sources are installed in the housing so that they irradiate the surface at a specified second angle when the housing is placed on top of the surface, which second angle is different from said first angle,
   c) first means in the housing located at a third angle for measuring intensities of light specularly reflected by the surface of the marking,
   d) second means in the housing located at a fourth angle for measuring intensities of light specularly reflected from the surface of the marking, and
   e) means for automatically comparing the measured intensities with stored reference intensities for the respective light sources for at least one specified color.

2. Device as defined in claim 1, wherein the specified spectral range has a width of less than 100 nm at half maximum intensity.

3. Device as defined in claim 1, wherein the light sources are light-emitted diodes, lasers or the free ends connected light-conducting fibers.

4. Device as defined in claim 1, wherein the means of measuring the intensities has at least one photo diode.

5. Device as defined in claim 1, wherein the first angle and the second angle are in a range from 15° to 45°.

6. Device as defined in claim 1, wherein a unit for the sequential illumination of the surface with the light sources and for the measurement of the particular intensities of the reflected light in a defined sequence is provided.

7. Device as defined in claim 1, wherein the emission maximum of the light sources is in near UV, in visible, or in IR spectral range.

8. Device as defined in claim 1, wherein the illumination and measuring duration is specified in dependence on luminance characteristic of each of the light sources and/or measuring characteristic of the means for measuring the intensities.

9. Device as defined in claim 1, wherein a mechanical arrangement, an electronic arrangement or a software arrangement, is provided to offset background light.

10. Device as defined in claim 1, wherein a unit is provided to modulate the light sources to separate interference signals from the measuring signals.

11. Device as defined in claim 1, wherein at least 3 and not more than 12 first and/or second light sources are provided.

12. Device as defined in claim 1, wherein the means for automatically comparing the measured intensities comprises a micro-controller.

13. Device as defined in claim 1, wherein an indication device including a display, or one or more additional light-emitting diodes, is provided to indicate results determined from the-comparison.

14. Method for checking the authenticity of a forgery-proof marking having a surface with colors which change depending on angle of observation, comprising the following steps:
   irradiating the surface of the marking with several first light sources emitting light in a specified spectral range at a first angle, wherein the light sources differ from each other in the wavelength of their emission maximum,
   irradiating the surface of the marking with several second light sources accommodated in a housing and emitting light in the specified spectral range at a second angle, wherein the second light sources differ from each other in the wavelength of their emission maximum,
   measuring intensities of light specularly reflected by the surface of the marking by first means for measuring of intensities arranged at a third angle in the housing,
   measuring intensities of light specularly reflected by the surface of the marking by second means for measuring of intensities arranged at a fourth angle in the housing, and
   comparing measured intensities with reference intensities stored for the particular light sources for at least one specified color.

15. Method as defined in claim 14, wherein the specified spectral range has a width of less than 100 nm at half maximum intensity.

16. Method as defined in claim 14, wherein the first, second, third and fourth angles are specified by installing the light sources and the means of measuring the intensities in a common housing.

17. Method as defined in claim 14, wherein light-emitting diodes, lasers or free ends connected light-conducting fibers are used as light sources.

18. Method as defined in claim 14, wherein at least one photo diode is used as the means of measuring the intensities.

19. Method as defined in claim 14, wherein the first angle and the second angle differ from one another and are in a range from 15° to 45°.

20. Method as defined in claim 14, wherein the light sources run sequentially in a defined order.

21. Method as defined in claim 14, wherein emission maximum of the light sources is located in ear UV, in visible or in IR spectral range.

22. Method as defined in claim 14, wherein duration of illumination and measurement is specified in dependence on luminance characteristic of each of the light sources and/or the measurement characteristic of the means of measuring the intensities.

23. Method as defined in claim 14, wherein background light is compensated for by using at least one of a mechanical arrangement, an electronic arrangement or a software arrangement.

24. Method as defined in claims 14, wherein the light sources are modulated to separate interference signals from measuring signals.

25. Method as defined in claim 14, wherein at least 3 and not more than 12 first and/or second light sources are provided.

26. Method as defined in claim 14, wherein the comparing measured intensities step is performed using a micro-controller.

27. Method as defined in claim 14, wherein result determined during the comparison is indicated via an indication device including a display or one or more additional light-emitting diodes.

* * * * *